April 18, 1950
W. E. HANN
2,504,833
INTERNAL-COMBUSTION OUTBOARD MOTOR HAVING AUXILIARY
ELECTRIC MOTOR FOR STARTING AND TROLLING
Filed June 20, 1946
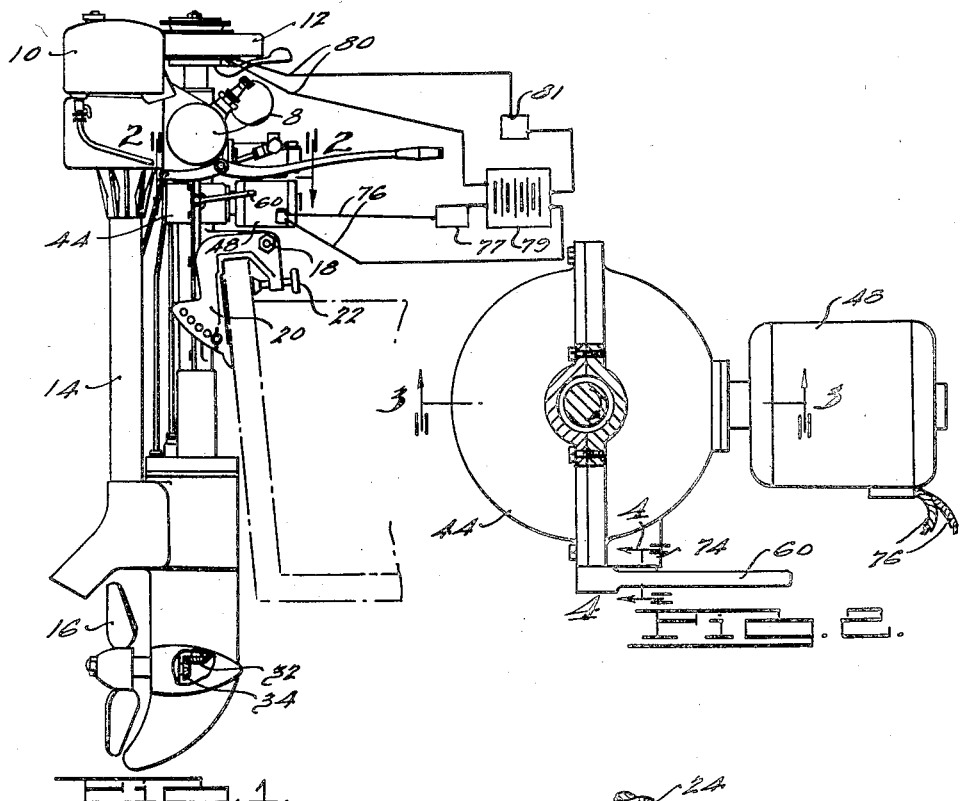
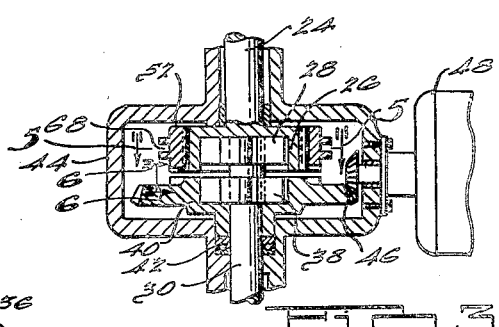
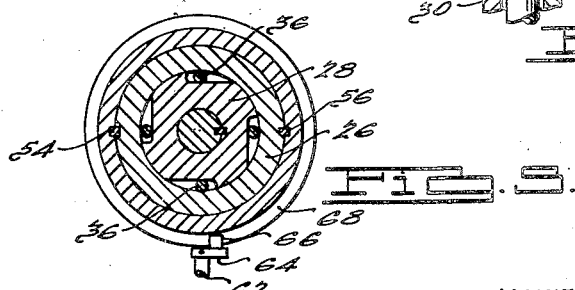
INVENTOR.
William Edward Hann,
BY
Harness, Dickey & Pierce.
ATTORNEYS.

Patented Apr. 18, 1950

2,504,833

UNITED STATES PATENT OFFICE 2,504,833

INTERNAL-COMBUSTION OUTBOARD MOTOR HAVING AUXILIARY ELECTRIC MOTOR FOR STARTING AND TROLLING

William Edward Hann, Los Angeles, Calif.

Application June 20, 1946, Serial No. 678,000

5 Claims. (Cl. 115—17)

This invention relates to outboard motors for small boats.

The main objects of this invention are to provide an improved outboard motor unit that has the power and is adapted to propel the craft to which it is attached at a high rate of speed when going to and coming from the fishing grounds, and which will propel it slowly and silently for trolling when the fishing grounds have been reached; to provide a combined gasoline motor and electric motor unit in which a single propeller may be driven by either motor independently of the other; to provide such a unit in which the electric motor may be used to crank the gasoline motor and upon starting of the gasoline motor, the electric motor is automatically disconnected from it; and to provide a combined gasoline and electric motor, outboard unit, in which the gasoline motor may be used to charge the battery which supplies current to drive the electric motor.

An illustrative embodiment of this invention is shown in the accompanying drawings, in which:

Fig. 1 is a view in side elevation of one exemplification of the improved combined outboard motor unit;

Fig. 2 is a sectional view taken on the line 2—2 of Fig. 1, looking in the direction indicated by the arrows;

Fig. 3 is a sectional view taken on the line 3—3 of Fig. 2, looking in the direction indicated by the arrows;

Fig. 4 is a fragmentary sectional view, taken on the line 4—4 of Fig. 2, looking in the direction indicated by the arrows;

Fig. 5 is a sectional view, taken on the line 5—5 of Fig. 3, looking in the direction indicated by the arrows;

Fig. 6 is a fragmentary view, partly in elevation and partly in section, taken on the line 6—6 of Fig. 3, looking in the direction indicated by the arrows.

In the use of outboard motors for propelling small boats used for fishing, it is well recognized that the ideal motor for trolling is an electric motor because it is silent, vibrationless and readily susceptible to control for propelling the boat at a relatively slow speed. Obviously, however, such a motor is practically useless for driving the boat to and from the fishing grounds, particularly when these fishing grounds are any considerable distance from the home port. The ideal motor for this purpose is a large, powerful, gasoline-driven motor, which will propel the fishing boat rapidly and without using up the electric current in the battery which supplies the power to the electric motor.

In the present invention, both of these ideal motor units have been combined in a unitary structure so that either motor may drive the propeller independently of the other motor and furthermore, the electric motor may be manually connected to the gasoline motor for the purpose of cranking the gasoline motor and when once started, the electric motor is automatically disconnected therefrom.

In the construction shown in the drawings, a gasoline type of outboard motor is shown provided with opposed cylinders 8, gasoline tank 10, fly wheel 12, exhaust pipe 14 and propeller 16, all of which in the usual and customary manner are pivoted at 18 on a clamping bracket 20, which is adapted to be removably secured to the stern of a boat by threaded clamp screws 22.

As shown in Fig. 3 the output end 24 of the gasoline motor crankshaft terminates in an inverted relatively shallow cup 26 which surrounds a cam head 28, non-rotatably secured to the top end of a vertically disposed drive shaft 30, the lower end of which is provided with a beveled gear 32 for meshing with a similar gear 34 on the propeller shaft, which carries the propeller 16. The cam head 28 is constructed after the well-known manner of over-running clutches and is provided with recesses for receiving roller elements 36. The roller elements 36 and the recesses which house them are so formed and constructed that the cam member 28 is free to rotate within the cup 26 when relative rotation is in one direction, but locks the two members together when rotated in the opposite direction after the usual and customary manner of over-running clutches.

The upper end of the driveshaft 30 immediately below the cam member 28 is provided with another cam member 38 of the same construction as the cam member 28, and it is also provided with the usual roller elements for locking the cam member to the other element of the clutch which in this instance is a bevel gear 40. The gear 40 is mounted on a thrust bearing 42 within the housing 44, which surrounds the over-running clutches. The gear 40 meshes with and is driven by a bevel pinion 46 secured to the armature shaft of an electric motor 48.

The upper surface of the bevel gear 40 is provided with an annular series of teeth 50, which are sloped on one side and axially straight on the other, somewhat after the manner of ratchet teeth. The cup 26 is surrounded by a sleeve 52, which is axially slidable on its outer surface and which is prevented from rotation relative thereto by keys 54 and 56 positioned at diametrically opposite points. The lower edge of the sleeve 52 is likewise provided with an annular series of teeth 58 of the same formation and size as the teeth 50, but sloped oppositely thereto so that when the teeth 50 and 58 are inter-engaged, driving rotation may be effected in one direction but not in the other.

Means are provided for manually shifting the teeth 58 into engagement with the teeth 50 and comprise a handle 60, mounted on the outer end of a shaft 62, which is rotatively journaled in the housing 44. The inner end of the shaft 52 is provided with a short lever arm 64, which carries an inwardly extending stub shaft 66 which fits between the side walls of an annular groove 68 formed about the outer periphery of the collar 52. The inner side of the handle 60, adjacent its pivoted end, is provided with a rib 70, which is engaged by a spring pressed ball 72 mounted in a recess formed in an extension 74 of the housing 44.

Electric conductors 76 lead from the electric motor 48 to a suitable switch and control device 77 and thence to a storage battery 79.

The fly wheel 12 houses an electric generator and in this instance it may be designed and constructed for the generating of 6 volt current, which through conductors 80, lead to the storage battery 79 through a suitable voltage regulator 81, as is customary practice in automobile generators. Thus the gasoline motor ignition system may be of the high tension coil and breaker box type, rather than the magneto type of ignition, which is so customary in outboard motors at the present time, but which often results in excessive cranking in order to start the motor.

In the operation of this outboard motor unit, the switch 77 may be closed to connect the conductors 76 to the storage battery 79, thus energizing the electric motor 48 and causing the pinion 46 on its armature shaft to drive the gear 40. The manual lever 60 at this time may be shifted to slide the sleeve 52 downwardly, thus engaging the teeth 58 with the teeth 50 on the driven gear 40. Engagement of the teeth will thus cause the electric motor to rotate the crankshaft 24 of the gasoline motor and crank it for starting purposes. As soon as the gasoline motor starts and attains a speed so that the cup 26 rotates faster than the bevel gear 40, the sloping teeth 50 and 58 will be cammed out of engagement with each other. At this time the lever will be shifted so that the rib 70 on the handle 60 passes over the center of the spring pressed ball 72, whereupon the ball 72 will continue moving the lever 60 until it attains a position where the teeth 50 and 58 are completely out of contact and engagement with each other.

As soon as the gasoline motor starts and attains such speed, the electric motor 48 may be disconnected from the battery 79 and thus the gasoline motor will drive the shaft 30 and propeller 16 through the upper over-running clutch. The bevel gear 40, pinion 46 and electric motor 48 will not be rotated because of the lower over-running clutch housed within the gear 40.

When the fishing grounds have been reached and it is desired to troll at a slow speed, the gasoline motor will be stopped and the electric motor 48 may be connected through its switch 77 and speed controls to the battery 79, thereby driving the shaft 30 at a relatively slow speed and noiselessly and with an absence of vibration, which is ideal for trolling purposes.

At the end of the fishing period, sleeve 52 is again shifted downwardly by manual operation of the handle 60 to engage the teeth 58 with the teeth 50 on the driven gear 40, thus causing the electric motor 48 to rotate and crank the gasoline motor. As soon as the gasoline motor is started, disengagement of the teeth will be automatically effected and the electric motor 48 may be disconnected from the battery 79. During the return trip, as well as during the trip to the fishing grounds and at all times when the gasoline motor is operated, current will be generated to charge the storage battery in the usual manner.

What is claimed is:

1. In an outboard motor for motor boats, a propeller, an internal combustion motor for driving the propeller, an over-running clutch interposed between said motor and said propeller, an electric motor for driving said propeller, an over-running clutch interposed between said electric motor and said propeller whereby either of said motors may drive said propeller independently without driving the other motor and means for connecting said motors together whereby said electric motor may crank said internal combustion motor.

2. In an outboard motor for motor boats, a propeller, an internal combustion motor for driving the propeller, an over-running clutch interposed between said motor and said propeller, an electric motor for driving said propeller, an over-running clutch interposed between said electric motor and said propeller whereby either of said motors may drive said propeller independently without driving the other motor and manually operable means for connecting said motors together whereby said electric motor may crank said internal combustion motor.

3. In an outboard motor for motor boats, a propeller, an internal combustion motor for driving the propeller, an over-running clutch interposed between said motor and said propeller, an electric motor for driving said propeller, an over-running clutch interposed between said electric motor and said propeller whereby either of said motors may drive said propeller independently without driving the other motor, means for connecting said motors together whereby said electric motor may crank said internal combustion motor and automatic means for disconnecting said motors when said internal combustion motor rotates faster than said electric motor.

4. In an outboard motor for motor boats, a propeller, an internal combustion motor for driving the propeller, an over-running clutch interposed between said motor and said propeller, an electric motor for driving said propeller, an over-running clutch interposed between said electric motor and said propeller whereby either of said motors may drive said propeller independently without driving the other motor, manually operable means for connecting said motors together whereby said electric motor may crank said internal combustion motor and automatic means for disconnecting said motors when said internal combustion motor rotates faster than said electric motor.

5. In an outboard motor unit for motor boats, the combination of a propeller, an internal combustion motor for driving said propeller, an electric motor for driving said propeller independently of said internal combustion motor, manually operable means for connecting said electric motor to said internal combustion motor whereby said electric motor may crank said internal combustion motor, automatic means for disconnecting said motors when said internal combustion motor starts and runs faster than said electric motor, a battery for supplying current to said electric motor and a generator driven by said internal combustion motor for charging said battery.

WM. EDWARD HANN.

REFERENCES CITED

The following references are of record in the file of this patent:

UNITED STATES PATENTS

| Number | Name | Date |
|---|---|---|
| 1,466,394 | Fornaca | Aug. 28, 1923 |
| 1,727,086 | Vasano | Sept. 3, 1929 |
| 2,180,599 | Menasco | Nov. 21, 1939 |

FOREIGN PATENTS

| Number | Country | Date |
|---|---|---|
| 165,701 | Switzerland | Nov. 30, 1933 |
| 201,810 | Germany | Sept. 22, 1908 |